US008126274B2

(12) United States Patent  (10) Patent No.: US 8,126,274 B2
Li et al.  (45) Date of Patent: Feb. 28, 2012

(54) VISUAL LANGUAGE MODELING FOR IMAGE CLASSIFICATION

(75) Inventors: Mingjing Li, Beijing (CN); Wei-Ying Ma, Beijing (CN); Zhiwei Li, Beijing (CN); Lei Wu, Anhui (CN)

(73) Assignee: Microsoft Corporation, Redmond, WA (US)

( * ) Notice: Subject to any disclaimer, the term of this patent is extended or adjusted under 35 U.S.C. 154(b) by 1216 days.

(21) Appl. No.: 11/847,959

(22) Filed: Aug. 30, 2007

(65) Prior Publication Data

US 2009/0060351 A1 Mar. 5, 2009

(51) Int. Cl.
 *G06K 9/62* (2006.01)
(52) U.S. Cl. ........................................ 382/224
(58) Field of Classification Search .................. 382/173, 382/181, 209, 224, 229, 230, 305; 704/251, 704/256.2
See application file for complete search history.

(56) References Cited

U.S. PATENT DOCUMENTS

| 7,043,474 | B2 | 5/2006 | Mojsilovic et al. | |
| 7,885,466 | B2* | 2/2011 | Perronnin | 382/224 |
| 2008/0059187 | A1* | 3/2008 | Roitblat et al. | 704/257 |

FOREIGN PATENT DOCUMENTS

| JP | 2004178569 A | 6/2004 |
| JP | 2005222304 A | 8/2005 |

OTHER PUBLICATIONS

Jin, Y., Image Annotations by Combining Multiple Evidence & WordNet, Nov. 2005.
Li, J., Automatic Linguistic Indexing of Pictures by a Statistical Modeling Approach , Sep. 2003.
Rui, X., A Search-Based Web Image Annotation Method , 2007.
Wang, B., Large-Scale Duplicate Detection for Web Image Seach , 2006.
Wang, C., Scalable Search-Based Image Annotation of Personal Images , Oct. 2006.
Fergus, R., Learning Object Categories from Google's Image Search, Proc. of the 10th Inter. Conf. on Computer Vision, ICCV 2005, 8 pages.
Peng, F., Combining Naive Bayes and n-Gram Language Models for Text Classification, Year: 2003, 15 pages.
Wang, et al., "AnnoSearch: Image Auto-Annotation by Search", retrieved on Apr. 16, 2010 at <<http://research.microsoft.com/en-us/um/people/leizhang/paper/cvpr06_annosearch.pdf>> IEEE Computer Society, Proceedings of Conference on Computer Vision and Pattern Recognition (CVPR), vol. 2, 2006, pp. 1483-1490.

* cited by examiner

*Primary Examiner* — Daniel Mariam
(74) *Attorney, Agent, or Firm* — Lee & Hayes, PLLC

(57) ABSTRACT

Systems and methods for visual language modeling for image classification are described. In one aspect the systems and methods model training images corresponding to multiple image categories as matrices of visual words. Visual language models are generated from the matrices. In view of a given image, for example, provided by a user or from the Web, the systems and methods determine an image category corresponding to the given image. This image categorization is accomplished by maximizing the posterior probability of visual words associated with the given image over the visual language models. The image category, or a result corresponding to the image category, is presented to the user.

17 Claims, 3 Drawing Sheets

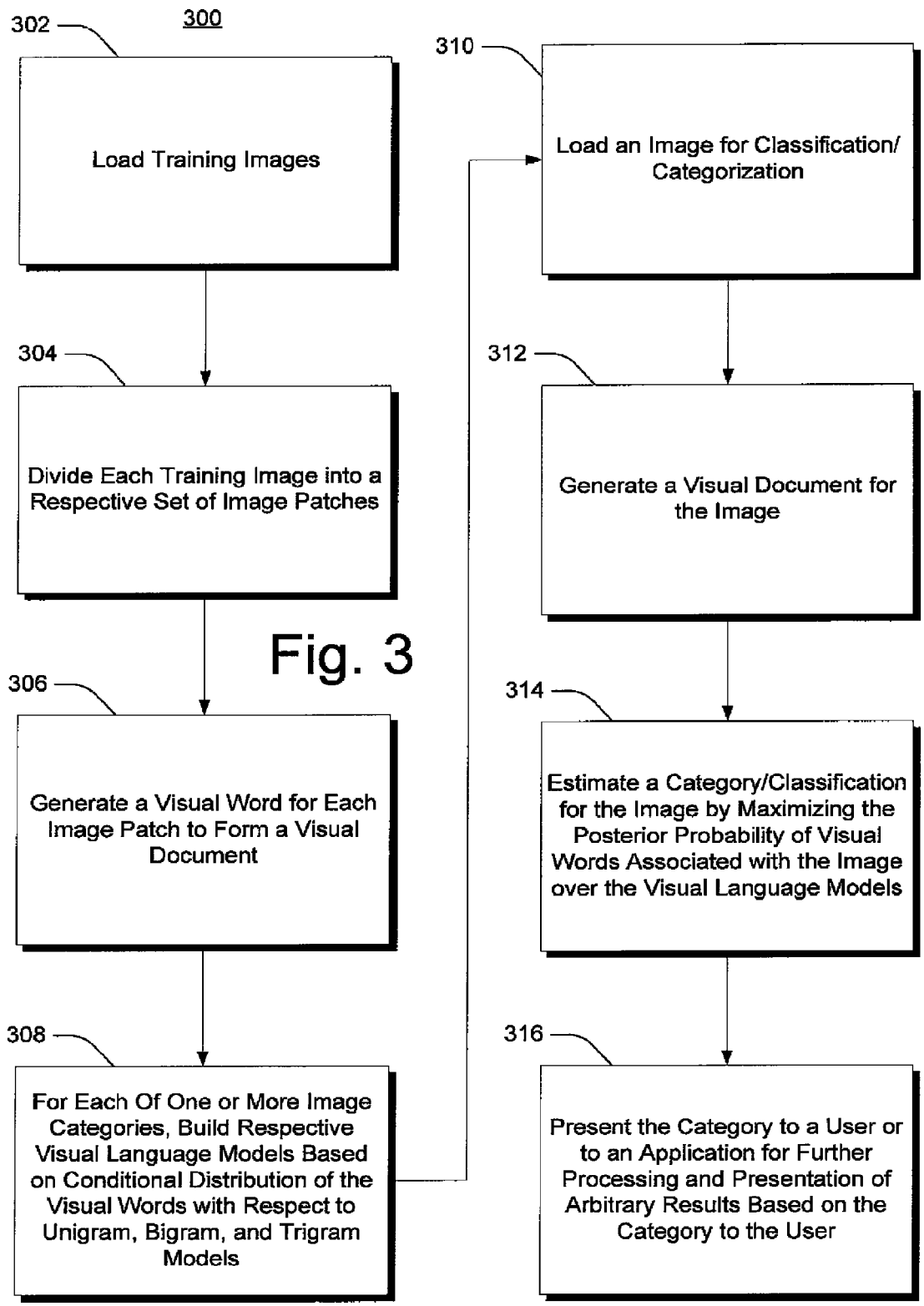

VISUAL LANGUAGE MODELING FOR IMAGE CLASSIFICATION

BACKGROUND

Image classification analyzes the numerical properties of various image features and organizes data into arbitrary predefined image categories. Classification algorithms typically employ two phases of processing: training and testing. In the initial training phase, characteristic properties of typical image features for a particular image category are isolated and, based on these, a unique description of each classification category, i.e. training class, is created. In the subsequent testing phase, these feature-space partitions are used to classify image features.

SUMMARY

Systems and methods for visual language modeling for image classification are described. In one aspect the systems and methods model training images corresponding to multiple image categories as matrices of visual words. Visual language models are generated from the matrices. In view of a given image, for example, provided by a user or from the Web, the systems and methods determine an image category corresponding to the given image. This image categorization is accomplished by maximizing the posterior probability of visual words associated with the given image over the visual language models. The image category, or a result corresponding to the image category, is presented to the user.

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

FIG. 3 shows an exemplary procedure for visual language modeling for image classification, according to one embodiment.

DETAILED DESCRIPTION

Overview

Regardless of whether conventional techniques for image classification techniques utilize global or local features, existing image classification approaches are substantially limited. Such limitations, for example, are due to the difficulties influenced by a complex background, occluding objects, semantic gaps between low-level visual features and high-level semantic concepts, etc. Moreover, conventional image classification approaches typically utilize only the co-occurrence of image features in classification, ignoring spatial correlation of such features, when spatial correlation could provide additional information to help image classification. These and other drawbacks of conventional image classification techniques have limited the practical application of image classification in many scenarios, such as web image search, video surveillance, medical image system, etc.

Figure 1:
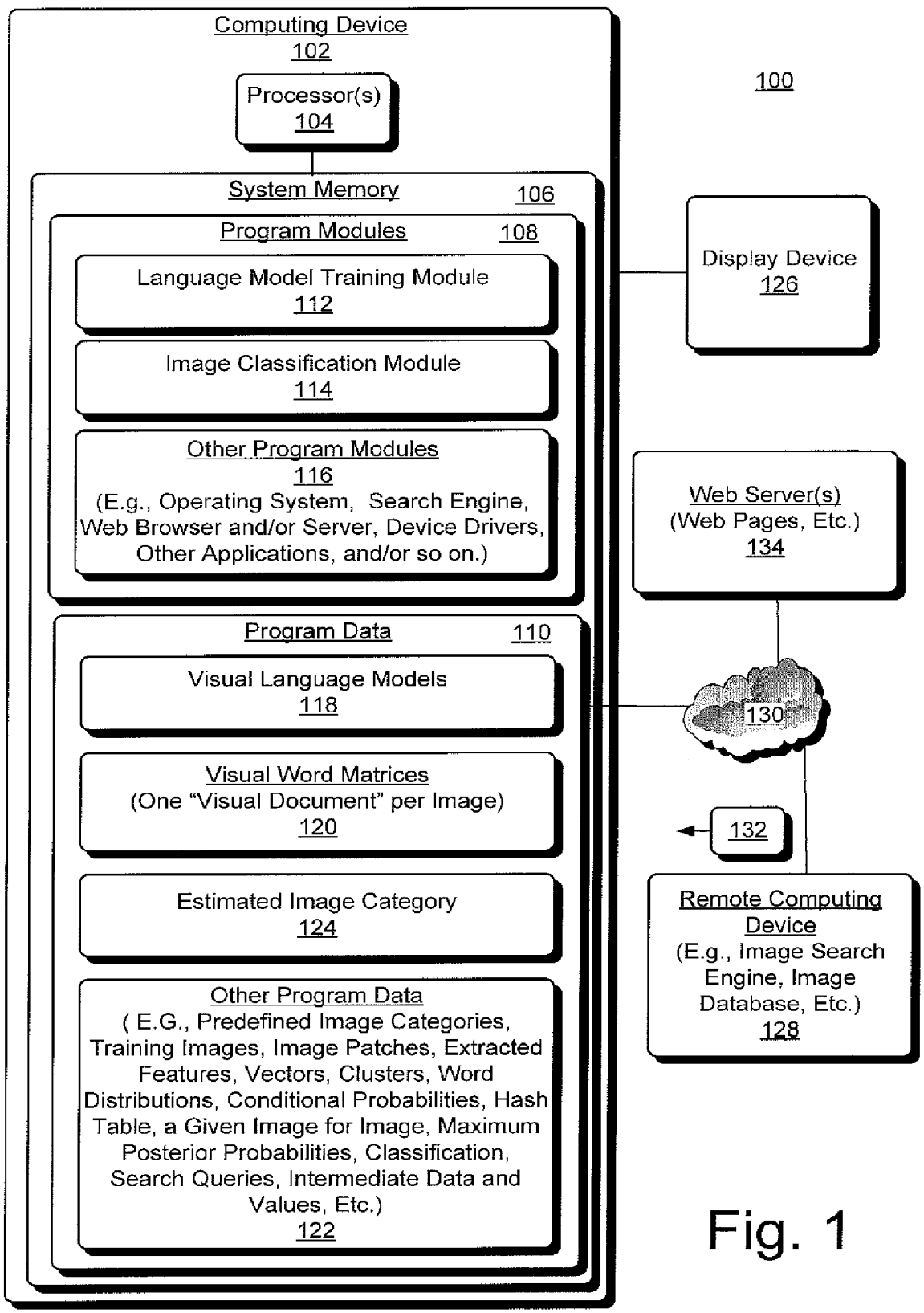
FIG. 1 shows an exemplary system for visual language modeling for image classification, according to one embodiment.
Figure 2:
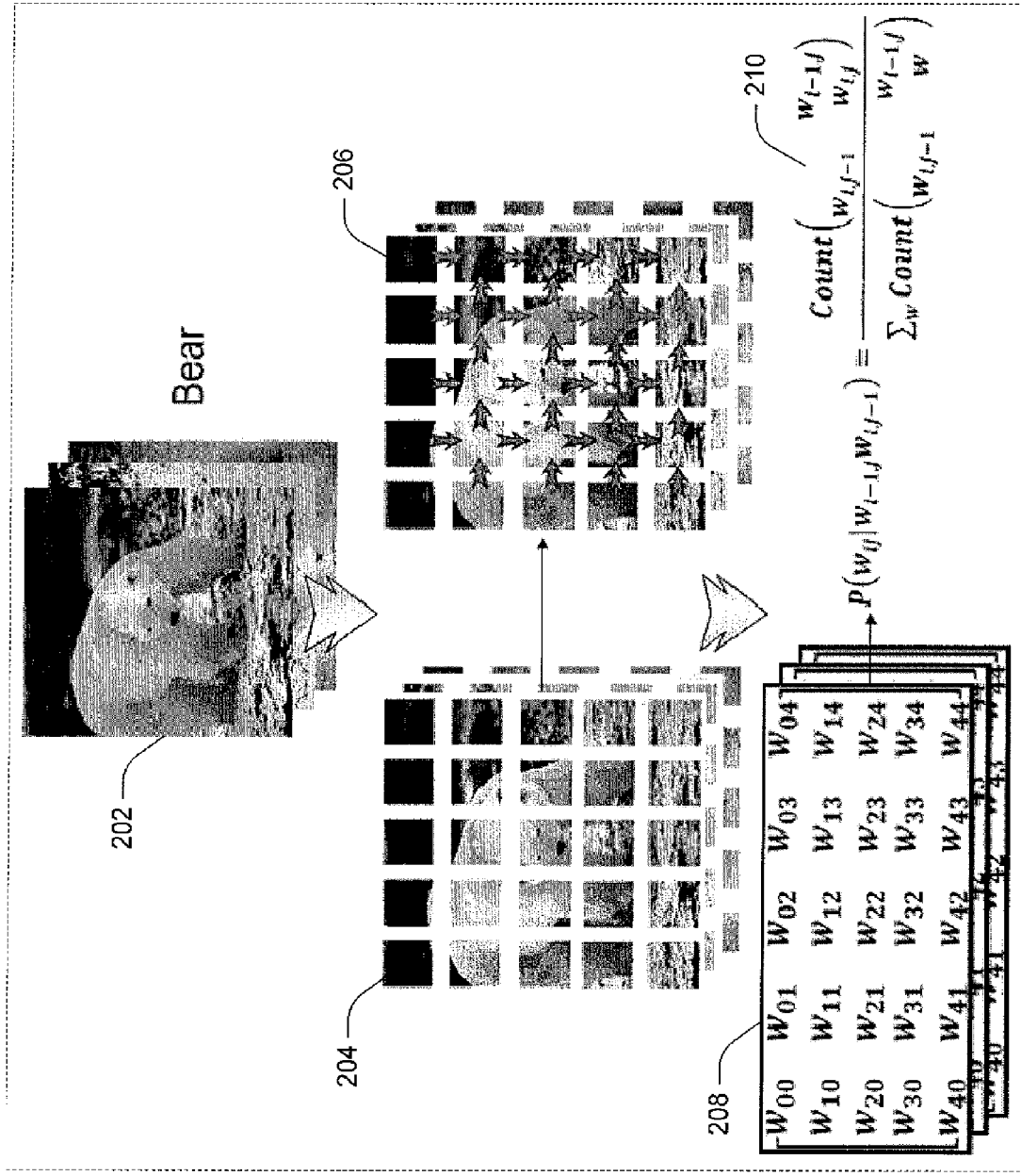
FIG. 2 shows an exemplary data flow and process for generating a trigram visual language model 118, according to one embodiment.

In contrast to traditional image classification system and techniques, systems and methods for visual language modeling, as described below with respect to FIGS. 1-3, provide content-based image classification that utilizes spatial correlation of visual words. To this end, the systems and methods apply concepts (e.g., vocabularies, grammars, etc.) related to statistical language modeling (SLM) in view of a set of training images to construct visual language models for respective image categories. (An overview of SLM is provided below in the section titled "Statistical Language Modeling.") For instance, a text document consists of words, each of which has its own semantic meanings, while an image consists of pixels. Within the context of an image, a single pixel, by itself, is typically not meaningful. However, a group of pixels together maybe meaningful. Thus, the systems and methods for visual language modeling represent image content with multiple local groups of pixels ("patches"), where each patch covers a respective sub-window/portion of the image. Considering variance of pixels within a local patch, there may be a large number of local patches for an image when the patch sizes are small. Thus, the systems and methods quantize the local patches (e.g., via clustering) into a limited number of visual words (a vocabulary) to facilitate visual language model training. In this manner, the systems and methods transform each image into a matrix of visual words to generate a vocabulary.

Analogously to natural language grammars that restrict text/word distribution and order to form meaningful sentences, etc., a visual language model is based on the assumption that there are implicit visual grammars in a meaningful image. Such visual grammars capture co-occurrence and proximity information of visual words (i.e., image patches) to provide constraints on how visual words can be combined to form a meaningful object. (Random combinations of image patches independent of a visual grammar will typically not result a meaningful image.) For example, images are two-dimensional (2-D) signals, whereas text documents are one-dimensional (1-D) in nature. To provide a grammar addressing the multiple dimensionalities of images, the systems and methods assume that each visual word is conditionally dependent on its neighboring visual words. If the size of the visual word vocabulary is n and a 4-neighbor dependence is considered, the number of conditional probabilities is $n^5$. To simplify the model, the systems and methods assume that an image is generated in a Markov process and its visual words are generated in the order from left to right and top to bottom. It can be appreciated that different assumptions of word generation order can also be utilized (e.g., right to left and/or bottom to top, etc.). With this assumption, a visual word is conditionally dependent on its previous words to train visual language models for predetermined arbitrary image categories. Such image categories can pertain to just about any image subject (e.g., vehicles, landscapes, people, animals, and/or so on) as a function of the particular implementation of the systems and methods. According to how many neighbors are taken in consideration, a number of different types of language models (e.g., unigram, bigram and trigram models) can be trained, each of which corresponds to a different level of model complexity. Given an image input for classification via the visual classification models, the systems and methods determine an image category for the given image by estimating how likely it belongs to one of the specific image categories modeled by the system.

Before describing these and other aspects for the systems and methods for visual language modeling for image classification, we first provide an overview of mature statistical language models that have proved to be successful in text classification.

Statistical Language Modeling

Statistical language modeling (SLM) has been widely used in natural language processing applications, such as automatic speech recognition, machine translation, automatic spelling correction, and text classification. SLM employs statistical estimation technique as a computational mechanism to obtain the conditional probability of a word sequence. The basic model can be represented as follows:

$$p(w_i^n) = p(w_i) \prod_{k=2}^{n} p(w_{i+k-1} \mid w_i^{k-1}) \quad (1)$$

$w_k$ represents the k-th word in the sequence. $w_i^n$ represents the string $w_i w_{i+1} \ldots w_{i+n-1}$. $p(w_i^n)$ is the probability that the word sequence appears. Usually, if SLM is adopted to estimate the conditional probability of word sequence of length n, it is called n-gram language model. Given a vocabulary V of size |V|, a unigram model has |V|−1 independent parameters; the one is removed by the constraint that all of the probabilities add up to 1. In the unigram case, the conditional probability becomes the word probability $$p(w_k) = \frac{\text{Count}(w_k)}{T},$$

where $\text{Count}(w_k)$ counts the number of times $w_k$ occurs in the category and T is the total number of words in the category. Accordingly, an n-gram model has $|V|^n - 1$ independent parameters. N-gram model estimates its parameters by counting the number of n-gram occurring in the document.

$$p(w_{i+n-1} \mid w_i^{n-1}, C) = \frac{\text{Count}(w_i^{n-1} w_{i+n-1} \mid C)}{\sum_w \text{Count}(w_i^{n-1} x \mid C)} \quad (2)$$

SLM is usually used in the context of a Bayesian classifier for text classification. Given a document, which is represented as a sequence of words, its category C* can be determined by the following equation.

$$C^* = \arg\max_C p(C_j) \pi_{w_i^n \in D} p(w_{i+n-1} \mid w_i^{n-1}, C_j) \quad (3)$$

if n=1, Eqn. (3) is a unigram classifier; if n=2, it is called a bigram classifier; if n=3, it is called a trigram classifier. Unigram and trigram classifier are mostly adopted in text classification.

An Exemplary System for Classifying Images Via Visual Language Modeling

Although not required, the systems and methods for visual language modeling for image classification, according to one embodiment, are described in the general context of computer-program instructions executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

FIG. 1 shows an exemplary system 100 for visual language modeling for image classification, according to one embodiment. In this implementation, system 100 includes computing device 102. Computing device 102 represents, for example a general purpose computing device, a server, a laptop, a mobile computing device, and/or so on, that accepts information in digital or similar form and manipulates it for a results based upon a sequence of instructions. To this end, computing device 102 includes one or more processors 104 coupled to a tangible computer-readable data storage medium such as a system memory 106. System memory 106 includes, for example, volatile random access memory (e.g., RAM) and non-volatile read-only memory (e.g., ROM, flash memory, etc.). Processor 104 may be a microprocessor, microcomputer, microcontroller, digital signal processor, etc. System memory 106 includes program modules 108. Each program module 108 is a computer-program application including computer-program instructions for execution by processor 104. System memory 106 also includes program data 110 that is generated and/or used by respective ones of the program modules 108. In this implementation, for example, program modules 108 include language model training module 112, image classification module 114, and "other program modules" 116 such as an Operating System (OS) to provide a runtime environment, device drivers, other applications, etc.

Visual Language Model Training

Language model training module ("training module") 112 builds visual language models 118 for image classification. To build language models 118, training module 112 divides each training image into a set of image patches, generates a hash code for each patch to form a visual document, builds visual language models for each image category by calculating conditional distribution of unigram, bigram, and trigram. FIG. 2 shows an exemplary data flow and process for generating a trigram visual language model 118, according to one embodiment. In this example, a training image 202 is segmented into a set of image patches 204 (visual words). Not all visual words are useful for classification. In this implementation, visual words are selected by the document frequency (DF) scheme. Only those words which often appear in different images are selected. (Feature selection is adopted in the language model training process). This approach can depress the influence of random background and reduce the size of the vocabulary. Next, selected image patches 204 are utilized to calculate conditional dependency on neighboring image patches/visual words. The image patches 204 are utilized to generate a hash code (e.g., Word (row, column)→"w(00) w(01) . . . ", etc.) for each patch to form a visual document 208. The conditional dependencies and the hash codes are then used to calculate conditional trigram distribution (calculation 210 represents Eqn. (17) described above) of individual visual words for a predetermined image category (C). This process is performed for each image category (i.e., conditional dependencies are not calculated for one image, but on all the images in one category). In this implementation, visual word distribution and conditional probability is also stored in a hash table. These operations are now described in greater detail in reference to FIG. 1.

Referring to FIG. 1, training module 112 transforms each image in a set of training images into respective matrices of visual words ("visual word matrices" 120). In one implementation, training module 112 segments a training image into a set of image patches. In one implementation, the image patches are uniformly sized (e.g., 8 pixels×8 pixels, etc.) to preserve spatial information between patches. Training module 112 extracts features from each image patch. In this implementation, such features include for example raw pixel values (e.g., in RGB or HSI color space), Scale Invariant Feature Transform (SIFT) descriptor (SD), texture histogram, and/or so on.

Training module 112 clusters the image patches to obtain cluster names/IDs. These cluster IDs are used to represent visual words, which form the visual word matrix 124 of the training image. For purposes of exemplary illustration, training images, image patches, and clusters are shown as respective portions of "other program data" 122. In this implementation, for example: (a) RGB and HSI features for each patch are described with a 192-dim vector (8 pixels×8 pixels×3 colors); (b) SD for each patch is represented with a 128-dimensional vector; and (c) texture histogram for each patch is represented with an 8-dimensional vector, which records the gradient magnitude in eight directions. In this implementation, and to make the texture histogram feature more robust to rotation, the directions are measured by the angle to the maximum gradient within the patch. In other implementations, one or more different features are extracted as different kinds of features suit different categories of images. For example, RGB and HSI features focus on difference in colors, while such features are sensitive to rotation and scaling. SD and TH features focus on texture information and are insensitive to rotation, but do not contain color information. As there is much redundancy in high dimensional local features, and in this implementation, in stead of clustering the features directly, training module 112 utilizes Principal Component Analysis (PCA) to project the former two features to lower dimensional space. The third feature does not need dimension reduction, as itself is already low dimensional feature. A low dimensional feature vector $v=[v_0, v_1, \ldots, v_k]$ is further transformed to a more compact hash code $H=[h_0\ h_1 \ldots h_k]$ (e.g., Wang, B., Li, Z. W., Li, M. J. and Ma, W. Y., "Large-Scale Duplicate Detection for Web Image Search", proceedings of IEEE International Conference on Multimedia & Expo (ICME'06), 2006). Each bit of the hash code indicates whether the corresponding dimension of the feature vector is above the average level or not. If $v_i$ is larger than the mean value within the patch, $h_i$ is set to 1 otherwise 0. In this way, training module 112 transforms the image into a matrix of visual words 120 represented by hash codes. A visual word matrix 120 is also hereinafter referred to as a "visual document."

To simplify the training process, training module 112 assumes that each word in a visual document is not independent, but correlated with all the other words in the document. However, when the size of the vocabulary in the document is large, there will be many relations to model. To reduce the number of relations to model, training module 112 assumes a particular visual word order of generation. In this implementation, training module 112 assumes that visual words are generated in the order from left to right, and top to bottom, although other orderings could also be utilized. Each word is conditionally dependent on its previous words. In another implementation, training module 112 assumes that visual words are generated from right to left, bottom to top, or from both directions. For simplicity, this implementation utilizes the first assumption, which is enough to measure the visual word proximity.

$$p(w_{ij}|w_{00}w_{01}\ldots w_{mn})=p(w_{ij}|w_{00}w_{01}\ldots w_{ij-1}) \quad (4)$$

Because calculation of the conditional probability of the equation (4) could be time consuming, training module 112 also assumes that each image patch in a visual document depends only on its immediate vertical and horizontal neighbors. There may be some statistical dependency on more remote (different) visual words. In this implementation, training module 112 does not utilize any more remote visual word dependency information.

To address different implementations that consider different amounts of visual word dependency information, training module 112 implements one or more of three kinds of visual language models 118: unigram, bigram and/or trigram. In unigram model, the visual words 120 associated with an image are considered independent to each other. In the bigram model, proximity between two neighboring visual words 120 is calculated. In the trigram model the visual words are assumed to depend on two immediate vertical and horizontal neighbors. These three models are expressed in Equations (5)-(7) respectively.

$$p(w_{ij}|w_{00}w_{01}\ldots w_{mn})=P(w_{ij}) \quad (5)$$

$$p(w_{ij}|w_{00}w_{01}\ldots w_{mn})=p(w_{ij}|w_{i-1,j}) \quad (6)$$

$$p(w_{ij}|w_{00}w_{01}\ldots w_{mn})=p(w_{ij}|w_{i-1,j}w_{i,j-1}) \quad (7)$$

Where $w_{ij}$ represents the visual word at Row i, Column j in the word matrix. The following sections describe the training process for the three kinds of models.

Exemplary Unigram Visual Language Model Training

For each category, a unigram model characterizes the distribution of individual visual words under the category.

$$p(w_k \mid C) = \frac{\text{Count}(w_k \mid C)}{\sum_{w \in V} \text{Count}(w \mid C)}, C = C_1, C_2, \ldots C_n \quad (8)$$

In this implementation, training module 112 implements the training process as described by Eqn. (8), where C represents a predefined category, and $w_k$ is the k-th visual word in the vocabulary. $\text{Count}(w_k|C)$ represents the number of times that the word $w_k$ appears in the training images of category C. To avoid zero probability which would cause the classifier to fail, each unseen word for the category is assigned a small prior probability. Accordingly, the amount of this prior probability is discounted from the appearing visual words to meet the condition that the sum of probability is 1. So smoothed word distribution is represented by Eqn. (9).

$$p(w_k \mid C) = \begin{cases} \frac{\text{Count}(w_k \mid C) \times \left(1 - \frac{1}{R}\right)}{\sum_{w \in V} \text{Count}(w \mid C)}, & \text{Count}(w_k \mid C) > 0 \\ 1/R & \text{otherwise} \end{cases} \quad (9)$$

Referring to equation (9), R is the total number of words in the training set of category C. This probabilistic model indicates how likely each word is generated from the category.

Exemplary Bigram Visual Language Model Training

Unlike the unigram model, a bigram model assumes that each visual word 120 is conditionally dependent on its left neighbor only. So training module 112 implements the training process is to learn the conditional probability according to the following Eqn. (10).

$$p(w_{ij} \mid w_{i,j-1}, C) = \left\{ \frac{\text{Count}(w_{ij}, w_{i,j-1} \mid C)}{\text{Count}(w_{i,j-1} \mid C)} \right. \tag{10}$$

Referring to equation (10), $w_{i,j-1}$ is the horizontal neighbor of $w_{i,j}$ in the visual words matrix 120. Bigrams, however, are sparsely distributed in the image, and the maximum likelihood estimation is usually biased higher for observed samples and biased lower for unobserved samples. Thus smoothing technique is utilized to provide better estimation of the infrequent or unseen bigrams. Instead of just assigning a small constant prior probability, this implementation adopts a more accurate smoothing method, which combines back-off and discounting, as described below in equations 11 through 13.

$$P(w_{ij} \mid w_{i,j-1}, C) = \tag{11}$$
$$\begin{cases} \beta(w_{i,j-1}) \times p(w_{ij} \mid C), & \text{if Count}(w_{i,j-1} w_{ij} \mid C) = 0 \\ \hat{p}(w_{ij} \mid w_{i,j-1}, C), & \text{otherwise} \end{cases}$$

$$\beta(w_{i,j-1}) = \frac{1 - \sum_{\text{Count}(w_{i,j-1} w) > 0} \hat{p}(w \mid w_{i,j-1}, C)}{1 - \sum_{\text{Count}(w_{i,j-1} w) > 0} p(w \mid C)} \tag{12}$$

$$\hat{p}(w_{ij} \mid w_{i,j-1}, C) = d_r \times \frac{\text{Count}(w_{i,j-1} w_{ij} \mid C)}{\text{Count}(w_{i,j-1} \mid C)} \tag{13}$$

Back-off method is represented in Eqn. (11) and (12), and discounting is represented in Eqn. (13). If the bigram does not appear in the category, training module 112 applies the back-off method is applied to calculate the bigram model from the unigram model by Eqn. (11) and (12). $\beta(w_{i,j-1})$ is the back-off factor. If bigram $w_{i,j-1} w_{i,j} \in D$ appears in category C, the discounting method is used to depress the estimation of its conditional probability. $d_r$ is called the discounting coefficient. There are many discounting methods, such as linear discounting (Eqn. 14) and absolute discounting (Eqn. 15).

$$d_r = 1 - \frac{n_1}{R} \tag{14}$$

$$d_r = \frac{r-b}{r} \tag{15}$$

$$d_r = \frac{n_1}{n_1 + 2n_2} \tag{16}$$

Referring to equation 14 and 15, r is the number of times bigram $w_{i,j-1} w_{ij}$ appears; R is the total number of words in the training set. Referring to equation 16, $n_1$ is the number of visual words that appear i times in the category.

Exemplary Trigram Visual Language Model Training

The trigram model has a number of differences from building of statistical models used in text classification. there are clear differences. In a traditional text document, trigram is a sequence of three words $<w_{i-2}, w_{i-1}, w_i>$, while in a visual words document, as it is arranged in matrix form, training module 112 assumes each visual word is conditionally dependent on its previous vertical and horizontal patches. So these three words form a trigram $<w_{i-1,j}, w_{i,j-1}, w_{ij}>$. The training process of a trigram model is illustrated in the following equation.

$$P(w_{ij} \mid w_{i-1,j}, w_{i,j-1}, C) = \frac{\text{Count}(w_{i-1,j} w_{i,j-1} w_{ij} \mid C)}{\text{Count}(w_{i-1,j} w_{i,j-1} \mid C)} \tag{17}$$

For the same reason with bigram model, discounting and back-off methods are also defined in trigram model.

$$P(w_{ij} \mid w_{i-1,j} w_{i,j-1}, C) = \tag{18}$$
$$\begin{cases} \beta(w_{i-1,j} w_{i,j-1}) p(w_{ij} \mid w_{i,j-1}, C), & \text{if Count}(w_{ij}^3 \mid C) = 0 \\ \hat{p}(w_{ij} \mid w_{i-1,j} w_{i,j-1}, C), & \text{otherwise} \end{cases}$$

$$\beta(W_{i-1,j} w_{i,j-1}) = \frac{1 - \sum_{\text{Count}(w_{i-1,j} w_{i,j-1} w) > 0} \hat{p}(w \mid w_{i-1,j} w_{i,j-1}, C)}{1 - \sum_{\text{Count}(w_{i-1,j} w_{i,j-1} w) > 0} \hat{p}(w \mid w_{i,j-1}, C)} \tag{19}$$

$$\hat{p}(w_{ij} \mid w_{i,j-1}, C) = d_r \times \frac{\text{Count}(w_{i,j-1} w_{ij} \mid C)}{\text{Count}(w_{i,j-1} \mid C)} \tag{20}$$

$w_{ij}^3$ represents the trigram $w_{i-1,j} w_{i,j-1} w_{ij}$. The spatial correlation between visual words is evaluated in the distribution of the trigrams.

Exemplary Image Classification

Image classification module 114 of FIG. 1 transforms a given image for classification into a matrix of visual words 120 to generate a visual document in the same way described above with respect to training module 112. Image classification module 114 then estimates the given image's image category (estimated image category 124) by maximizing the conditional distribution of n-grams (n=1, 2, 3) over all predefined image categories. In one implementation, image classification module 114 presents the estimated image category 124 to a user (e.g., via display device 126). In another implementation, image classification module 114 presents the estimated image category 124 to a different application 116 for arbitrary processing and presentation of different information related to the estimated image category to a user.

More particularly, to determine the estimated image category 124, image classification module 114 assigns the given input image for classification the most probable category (i.e., the estimated image category 124) by maximizing the posterior probability, as follows:

$$C^* = \arg\max c_j p(C_j \mid D) \tag{21}$$

Referring to equation (21), D represents a visual document generated from the given image for classification. The maximum probability over all categories $c_j$, j=1, 2, ... K is chosen as its label $C^*$.

For unigram visual language model 118, visual words in the document D are assumed independent to each other. Thus the classification process can be transformed into the form of Eqn. (22).

$$C^* = \arg\max_{c_j} \Pi_{w_{ij} \in D} p(w_{ij} \mid C_j) p(C_j) \tag{22}$$

For bigram visual language model 118, words in D are dependent to its left neighbor. So the classification is formulated as the following maximizing process.

$$C^* = \arg\max_{C_j} \Pi_{w_{i,j-1}, w_{ij} \in D} p(w_{i,j-1}|C_j) p(C_j) \quad (23)$$

Accordingly, a trigram visual language model 118 based classifier is illustrated by the subsequent equation.

$$C^* = \arg\max_{C_j} \Pi_{w_{ij} 3 \in D} p(w_{ij}|w_{i-1,j} w_{i,j-1}, C_j) p(C_j) \quad (24)$$

In this implementation and because word distribution and conditional probability is stored in a hash table, this image classification process is implemented via hash table lookup.

An Exemplary Procedure

FIG. 3 shows an exemplary procedure 300 for visual language modeling for image classification, according to one implementation. For purposes of exemplary illustration and description, operations of procedure 300 are described with respect to aspects of FIG. 1. In the description, the left-most numeral of a component reference number indicates the particular figure where the component was first introduced. In one implementation, operations of procedure 300 are implemented by respective computer program modules 108 of computing device 102 of FIG. 1.

Referring to FIG. 3, operations of block 302 load a set of training images. In one implementation, training module 112 obtains the training damage from a local database. In another implementation, for example, training module 112 obtains the training images from a remote computing device 128 coupled to computing device 102 over a communication network 130 such as the Internet, an intranet, etc. In another implementation, for example, training module 112 queries and image search engine to obtain the training images pertaining to predefined image categories via search results 132. In this latter implementation, for example, search engine obtains the training images from one or more Web servers 134. These are only examples of many arbitrary ways to obtain such training images.

Operations of block 304 divide/segment each trading image into a respective set of image patches, or visual words. In one implementation, for example, these image patches are uniform in size. Operations of block 306, for each image patch in each training image, generate a hash code for the image patch to form a visual document (a visual word matrix 120) for the training image. To this end, operations of block 306 extract feature vectors to describe properties of the patch, reduce redundancy of the extracted features, and implement hash coding. Operations of block 308, for each of one or more predetermined image categories, build respective visual language models 118 based on conditional distribution of visual words with respect to the image category. In one implementation, for example, the visual language models comprise unigram, bigram, and trigram visual language models for each image category.

Operations of block 310 load an image for classification/categorization using the generated visual language models 118. Such loading can be implemented in any of multiple different arbitrary ways (e.g., responsive to user input, responsive to application input, and/or so on). Operations of block 312 generate a visual document (i.e., a visual word matrix 120) for the image. This is accomplished in the same way that visual documents were generated for each training image, as described above. Operations of block 314 estimate an image category 124 for the given image by maximizing conditional distribution of n-grams (n=1, 2, and 3) over each of the image categories. Operations of block 316, and one implementation, for example, present the estimated image category 124 to a user (e.g., via display device 126). In another implementation, operation cell block 316 communicate the estimated image category to an application (e.g., a respective "other program module" 116, application executing on remote computing device 128, and/or so on) for further processing and presentation of arbitrary results to the user, wherein the arbitrary results are based on the communicated estimated image category.

Conclusion

Although the above sections describe visual language modeling for image classification in language specific to structural features and/or methodological operations or actions, the implementations defined in the appended claims are not necessarily limited to the specific features or actions described. Rather, the specific features and operations to preserve validity of upper data layers for software fuzzing using lower data layers are disclosed as exemplary forms of implementing the claimed subject matter.

The invention claimed is:

1. A method at least partially implemented by a computing device, the method comprising:
    modeling images representing multiple image categories as respective matrices of visual words;
    generating visual language models from the respective matrices of visual words, the generating comprising:
        correlating visual words in the matrices of visual words according to a visual word grammar indicating conditional distribution of the visual words; and
        for each category of the multiple image categories, building respective visual language models based on the conditional distribution of the visual words;
    estimating an image category for an image in view of the visual language models; and
    presenting the image category or a result based on the image category to a user.

2. The method of claim 1, wherein modeling the images as respective matrices of visual words, the images are training images, and wherein the modeling further comprises:
    for each training image:
    dividing the training image into multiple image patches, each image patch being a group of pixels;
    for each image patch of the image patches:
    extracting features to describe one or more properties of the patch;
    representing at least a subset of the features as one or more multidimensional vectors;
    transforming, in view of a visual word grammar, the one or more multidimensional vectors into a respective hash code, the respective hash code being a visual word of the visual words, the visual word being in a visual document corresponding to the training image.

3. The method of claim 2, wherein the method further comprises selecting the features to emphasize aspects of a category corresponding to the training image.

4. The method of claim 1, wherein the visual grammar indicates that visual words are conditionally dependent on only previous visual words.

5. The method of claim 1, wherein a first model of the visual language models treats visual words corresponding to the training image as independent visual words, a second model of the visual language models is based on proximity between neighboring visual words, and a third model of the visual language models is based on visual word dependency on immediate vertical and horizontal neighboring visual words.

6. The method of claim 5, wherein the first model is a unigram model, the second model is a bigram model, and the third model is a trigram model.

7. The method of claim 1, wherein the images are training images, and wherein estimating the image category further comprises:
generating a visual document for the image, the visual document comprising a matrix of visual words;
maximizing, for each category of the multiple image categories, conditional distribution of n-grams of individual words of the visual words with respect to the visual language models; and
calculating the image category to be a category associated with a maximum posterior probability to indicate a likelihood that the image is generated by the category, the maximum posterior probability being a generalization probability represented by a product of all conditional probabilities of n-gram.

8. The method of claim 7, wherein "n" in the n-grams comprises 1, 2, and 3.

9. A computer storage device storing computer executable instructions, which, when executed by the computer, cause the computer to perform operations, the operations comprising:
building visual language models from matrices of visual words generated from a set of training images, the visual language models being based on a visual word grammar, the training images corresponding to one or more predetermined image classifications, the building comprising:
for each training image:
dividing the training image into multiple image patches, each image patch being a group of pixels;
for each image patch of the image patches:
extracting features to describe one or more properties of the patch;
representing at least a subset of the features as one or more multidimensional vectors;
transforming, in view of a visual word grammar, the one or more multidimensional vectors into a respective hash code, the respective hash code being a visual word of the visual words;
creating a visual document from an image for image categorization;
determining an image category for the image based on characteristics of the visual document in view of the visual language models, and the image category corresponding to a classification of the one or more predetermined image classifications; and
presenting the image category or a result based on the image category to a user.

10. The computer storage medium of claim 9, wherein the visual word grammar indicates that visual words are conditionally dependent on other visual words according to a predetermined order of word generation.

11. The computer storage medium of claim 9, wherein the operations further comprise operations for selecting the features to emphasize aspects of a classification corresponding to the training image.

12. The computer storage medium of claim 9, wherein the operations further comprise operations for:
correlating the visual words according to a conditional distribution of the visual words; and
for each classification of the one or more predetermined image classifications, building respective visual language models based on the conditional distribution of the visual words, a first model of the visual language models treating visual words corresponding to the training image as independent visual words, a second model of the visual language models being based on proximity between two neighboring visual words, a third model of the visual language models being based on visual word dependency on immediate vertical and horizontal neighboring visual words.

13. The computer storage medium of claim 12, wherein the first model is a unigram model, the second model is a bigram model, and the third model is a trigram model.

14. The computer storage medium of claim 9, wherein determining the image category further comprises:
generating a visual document for the image, the visual document comprising a matrix of visual words;
maximizing, for each classification of the one or more predetermined image classifications, conditional distribution of n-grams of individual words of the visual words with respect to the visual language models; and
calculating the image category to be a category associated with a maximum posterior probability to indicate a likelihood that the image is generated by the category, the maximum posterior probability being a generalization probability represented by a product of all conditional probabilities of n-gram.

15. A computing device comprising:
a processor; and
a memory couple to the processor, the memory including computer-program instructions encoded thereon, the computer-program instructions, when executed by the processor, for performing operations comprising:
loading a set of training images associated with corresponding image categories;
for each training image of the training images:
(a) dividing the training image into a respective set of image patches;
(b) generating a visual word for each image patch to form a respective visual document for the training image;
for each category of the one or more image categories, generating visual language model(s);
estimating, using the visual language model(s), an image category for a given image comprising:
generating a visual document comprising respective visual words from the given image to determine a conditional distribution of the visual words over respective ones of these visual language model(s), a visual language model associated with a largest conditional distribution of the visual words indicating the image category; and
presenting the image category or a result corresponding to the image category to a user.

16. The computing device of claim 15, wherein the visual language model(s) comprise a unigram visual life which model, a bigram visual language model, and a trigram visual language model.

17. The computing device of claim 15:
wherein generating the visual word for each image patch further comprises extracting one or more features from the image patch to describe properties of the image patch, the one or more features being selected according to a image category corresponding to the training image; and
wherein the features are used to generate a model of the visual language model(s).

* * * * *